(12) United States Patent
Carberry et al.

(10) Patent No.: US 6,471,414 B2
(45) Date of Patent: Oct. 29, 2002

(54) SPRING CLIP ASSEMBLY FOR FIBER OPTIC ADAPTER

(75) Inventors: John Carberry, Talbott, TN (US); Michael L. Smith, Jefferson City, TN (US)

(73) Assignee: Neptec Optical Solutions, Inc.

( * ) Notice: Subject to any disclaimer, the term of this patent is extended or adjusted under 35 U.S.C. 154(b) by 0 days.

(21) Appl. No.: 09/975,044

(22) Filed: Oct. 11, 2001

(65) Prior Publication Data

US 2002/0041738 A1 Apr. 11, 2002

Related U.S. Application Data

(63) Continuation-in-part of application No. 09/685,115, filed on Oct. 10, 2000, now Pat. No. 6,363,199.

(51) Int. Cl.[7] ................................................. G02B 6/36
(52) U.S. Cl. .......................... 385/53; 385/56; 385/134; 385/136; 385/137
(58) Field of Search .......................... 385/53, 55, 56, 385/58, 60, 62, 66, 70, 72, 134, 51, 81, 136, 137

(56) References Cited

U.S. PATENT DOCUMENTS

| 5,073,042 | A | * | 12/1991 | Mulholland et al. | .......... 385/69 |
| 5,214,735 | A | | 5/1993 | Henneberger et al. | ...... 385/136 |
| 5,317,663 | A | * | 5/1994 | Beard et al. | .................. 385/70 |
| 6,019,521 | A | * | 2/2000 | Manning et al. | .............. 385/77 |
| 6,042,428 | A | * | 3/2000 | Espirtu et al. | .............. 439/686 |
| 6,240,229 | B1 | * | 5/2001 | Roth | ........................... 385/53 |
| 6,325,335 | B1 | * | 12/2001 | Harvey | ...................... 248/27.1 |

* cited by examiner

Primary Examiner—Brian Healy
Assistant Examiner—Sarah U Song
(74) Attorney, Agent, or Firm—Pitts & Brittian, P.C.

(57) ABSTRACT

An apparatus having at least one spring clip disposed on a connector adapter housing for releasably mating with an opening in an enclosure, the housing having fiber optic cables connected to opposed ends of the housing. When connected through an opening in an enclosure, the connector adapter housing maintains alignment of the opposed fiber optic cables for optical communication. The spring clip includes at least one clip member disposed upwardly from the surface of the spring clip. The spring clip is slidably inserted through a groove on at least one surface of the aligned connector housings. For release of the aligned connector housings, the spring clip is manipulated to slide along the groove, to compress the at least one clip member, allowing the housing to be removed from the enclosure opening for separation of the fiber optic cables from optical communication.

21 Claims, 6 Drawing Sheets

SPRING CLIP ASSEMBLY FOR FIBER OPTIC ADAPTER

CROSS-REFERENCE TO RELATED APPLICATIONS

This application is a CONTINUATION-IN-PART and claims subject matter disclosed in the earlier filed U.S. patent application, Ser. No. 09/685,115, filed Oct. 10, 2000, now U.S. Pat. No. 6,363,199.

STATEMENT REGARDING FEDERALLY SPONSORED RESEARCH OR DEVELOPMENT

Not Applicable

BACKGROUND OF THE INVENTION

1. Field of Invention

This invention relates to a fiber optic cable adapter. More specifically, the present invention relates to a quick disconnect spring clip assembly for fiber optic cable connection adapters.

2. Description of the Related Art

Fiber optic cables are commonly used for signal transmission. In order to facilitate the use of fiber optic cables, various connectors are employed to temporarily connect and align fiber optic cables at a control panel or housing. Such connections typically include a component which is mounted in a panel opening or a wall opening, and which has a split sleeve for receiving and supporting the ends of two cables. The connection typically includes cable connectors which mate with the first panel adapter. The cables have a ferrule and utilizes the other end of the split sleeve for receiving and supporting the end of the second cable in alignment with the end of the first cable. The adapter component generally is provided with some means for releasably securing the adapter connector component in the panel opening or wall opening. A typical panel-mounted connector adapter utilizes a pair of retaining clips which expand against an interior surface of the panel once the component has been inserted into the panel opening. The expanded retaining clips prohibit the connector adapter component from being removed from the opening unless selective compression is applied on the clips from within the interior of the panel, therefore requiring an operator to attain access to the interior of the panel.

It has been recognized that where panel-mounted connectors are used, it is important that the cable ends, and ferrule end connections, be clean and smooth to insure efficient signal transmission. Accordingly, frequent disassembly and cleaning of the connectors and cable ends is desirable. Where panel-mounted connectors with retaining clips are used, the connectors must be removed for cleaning periodically with minimal access into the interior of the housing in which the connector components are mounted. Therefore, there is a need for a clip fastener attachable to a housing connector adapter, having a fiber optic cable attached thereto, to provide ease of disassembly of the housing connector adapter and fiber optic cable from the exterior side of a panel or housing.

BRIEF SUMMARY OF THE INVENTION

In accordance with the present invention, there is provided an apparatus for releasably mating a connector system to an enclosure or panel, with the connector system having one or more fiber optic cables connected thereto. The apparatus includes a spring clip having a first clip member and a connector housing having a first distal end and a second distal end connectable together in an aligned configuration for insertion of the second distal end into an opening in the enclosure. The spring clip is in slidable communication with the first and second distal ends of the mating adapter housing. A restraining clip is attached to the second distal end of the connector housing for selectively compressing the first clip member of the spring clip when the spring clip is manipulated by an operator. Upon compressing of the first clip member against the restraining clip, the spring clip is moved toward the second distal end by the operator for removal from the opening of the connector housing.

One embodiment includes a first and a second connector housing of like configuration, with the connector housings connected in aligned orientation for insertion into an opening in an enclosure. Each connector housing includes a pair of connector grooves aligned on opposed sides of each connector housing. When the connector housings are aligned end-to-end, each spring clip is insertable into respective connector grooves for releasably mating the connector housings into the opening of the enclosure.

Each spring clip includes a first insertion end and a second end, and at least one clip member on each spring clip. The first insertion end is insertable into one connector groove of one connector housing, and is insertable through an opening through a flange on the proximal end of the first connector housing, for extension into an aligned connector groove of the second housing when the housings are aligned end-to-end. Extending from a first surface of each spring clip is at least two clip members including a first clip member and a second clip member disposed in opposing relationship on the first surface of the spring clip. The first and second clip members each have a free end extended out of the horizontal plane of the spring clip.

To release the connector housings from the opening in the enclosure, the operator manipulates the second clip member of each spring clip and compresses the second clip member toward the horizontal plane of the spring clip, thereby allowing each spring clip to slide inwardly toward the second connector housing positioned interior of the enclosure along each respective connector groove. Upon movement of each spring clip along the length of each groove, the first clip member is biased against a retainer clip on an interior end of the second connector housing, therefore compressing the first clip member to bend toward the horizontal plane of the spring clip, allowing the first and second connector housings to be removed from the opening in the enclosure. The respective optic fiber cables are then inspected and disconnected from each connector housing without removal of the enclosure, thereby facilitating cleaning and repositioning respective fiber optic cables in alignment for optical communication.

DETAILED DESCRIPTION OF THE INVENTION

Figure 1:
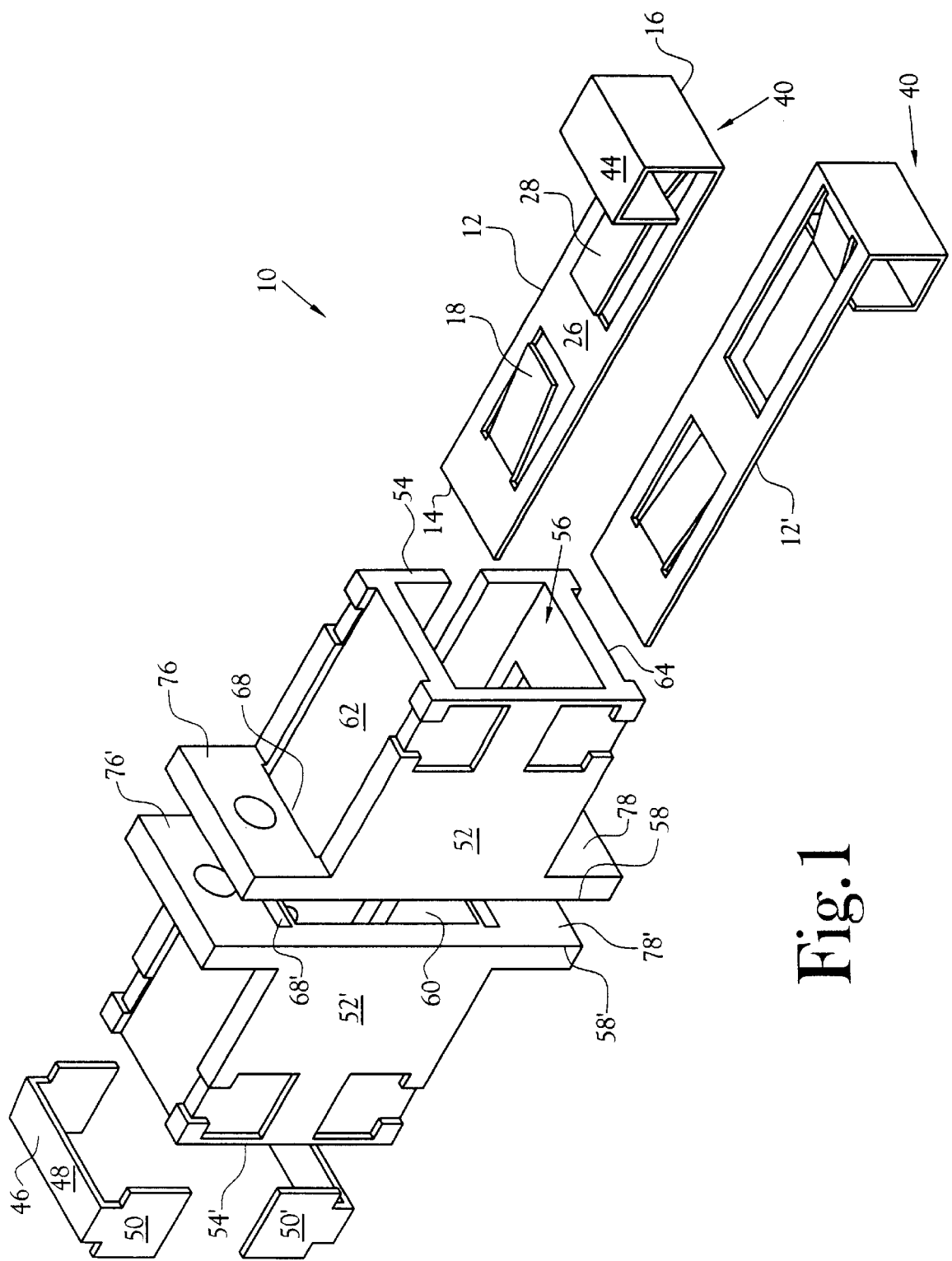
FIG. 1 is a perspective view of one embodiment of a pair of spring clips connectable to respective housing connectors of the present invention.

A connector adapter assembly 10 including a spring clip 12 and a connector adapter housing 52 of the present invention as illustrated generally in FIG. 1, for releasably mating with a second housing adapter connector 52' of like configuration. The spring clip 12 and the connector housing 52 provide a system for releasably connecting and aligning a pair of fiber optic cables positioned on opposed sides of an enclosure or panel 84. As illustrated in FIG. 1, the connector assembly 10 is configured to allow insertion and removal of spring clips 12, 12' from respective connector grooves 62, 64 positioned on each like configured connector housing 52, 52', without requiring an operator to access the interior of an enclosure 84 to which the connector assembly 10 is releasably mated thereto.

Figure 4A:
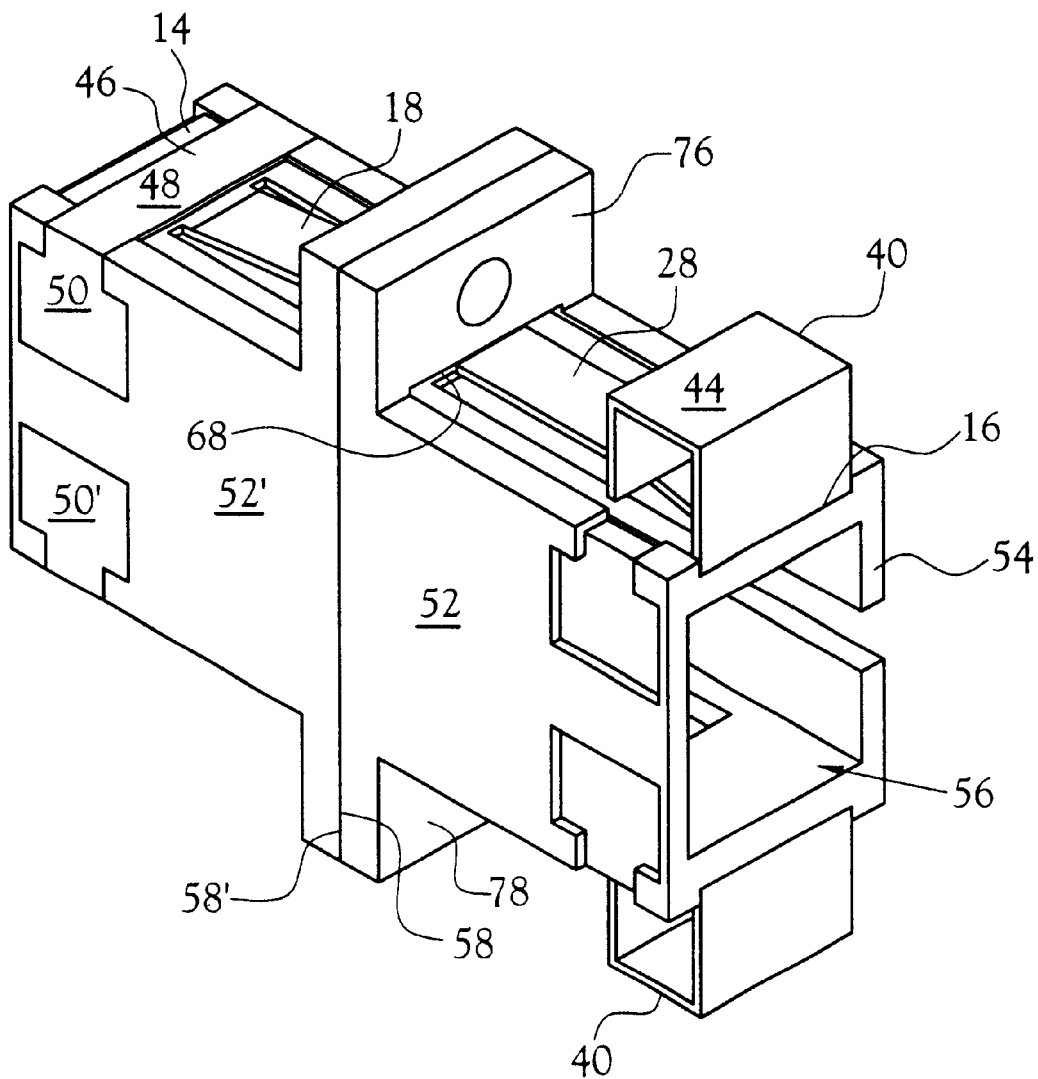
FIG. 4a is a perspective view of an assembled pair of spring clips and housing connectors, and restraining clips of FIG. 1.

FIG. 1 and 4a illustrate one embodiment of the connector assembly 10 that includes a plurality of components, including at least two spring clips 12, 12', each having generally planar upper and lower surfaces. Each spring clip 12, 12' is slidably connectable to opposed sides of respective connector housings 52, 52'. The spring clip 12 may be composed of a material such as spring steel having a thickness of about one millimeter to about three millimeters. Each spring clip 12, 12' includes at least two clip members 18, 28 disposed in aligned and opposing relationship on the same surface of the spring clip 12 (see FIG. 2). The spring clip 12 includes a first insertion end 14, a second end 16, and a mid-portion 26 at about the middle of the linear length of each spring clip 12, 12'.

The first clip member 18 is extended outwardly from the generally planar first surface of the mid-portion 26 of the spring clip 12, and includes an origination end 22 connected to the spring clip 12 proximal to the insertion end 14. The first clip member 18 includes a free end 20 that is positioned proximal to the mid-portion 26 of the spring clip 12 in an unbent position (see FIGS. 1 and 2) above the generally planar first surface of the mid-portion 26. The height of the free end 20 above the spring clip 22 is determined by the angle of the first clip member 18 relative to the surface of the mid-portion 26 of the spring clip 12.

Figure 3:
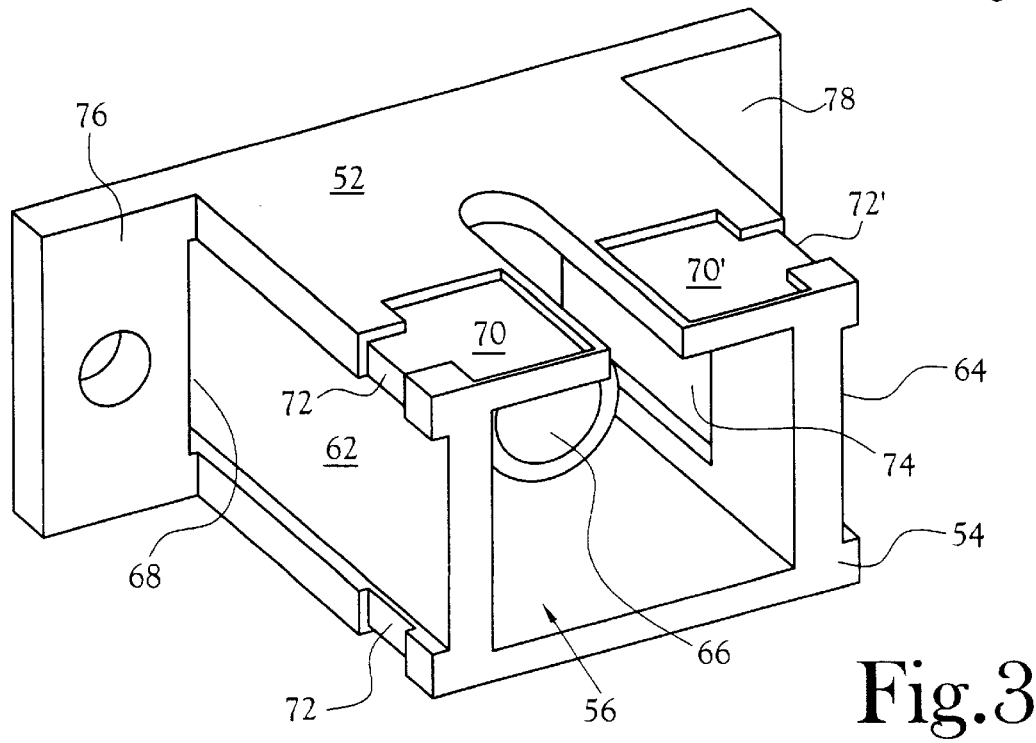
FIG. 3 is a perspective view of one embodiment of a connector housing.

One embodiment of the spring clip 12 includes a length 24 of the first clip member 18 extending a pre-selected distance from the origination end 22 to the free end 20 of the clip member 18. The angle of the first clip member 18 allows the free end 20 to be positioned at a height of about one millimeter above the horizontal plane of the spring clip 12. The free end 20 is bendable to a second position (not shown) toward the horizontal plane of a first surface of the spring clip 12 by direct manipulation by an operator, if the operator is provided access to the insertion end 14 when installed on a connector housing 52. Upon insertion of spring clip 12 on at least one side of connector housing 52 (see FIGS. 1 and 3), the free end 20 is bent upon passage of the insertion end 14 through an opening 68 in connector housing 52. The free end 20 returns to the unbent position after passage through the opening 68, with the insertion end 14 positioned on the distal side of first connector seating flange 76.

Figure 2:
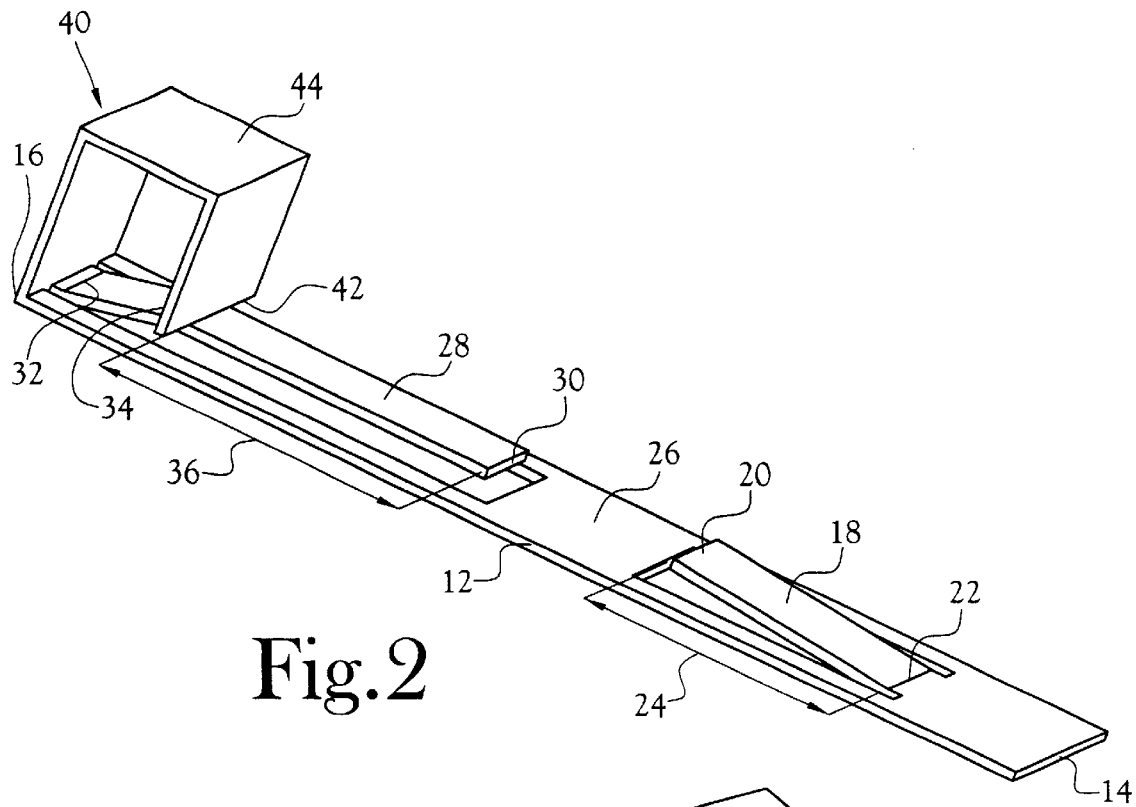
FIG. 2 is a perspective view of one embodiment of a spring clip.

Referring to FIG. 2, the second clip member 28 includes an origination end 32 connected in bent configuration proximate to the spring member second end 16. The second clip member 28 includes a free end 30 that is positioned proximal to the mid-portion 26 of the spring clip 12 in a first, neutral position (see FIG. 2) above the horizontal plane of the linear length of the spring clip 12. The origination end 32 includes at least two bendable portions, including a first bend proximate to the origination end 32 of the second end 16, and a second bend 34 spaced apart from the first bend along the length of the second clip member 28. The second bend 34 is angled at a selected angle to position the length 36 of the second clip member 28 in a generally parallel, spaced-apart orientation with the first surface of the spring clip 12. In one embodiment, the free end 30 is maintained at a height of one millimeter to two millimeters above the planar first surface of the spring clip 12 when the second clip member 28 is in an unbiased configuration. The free end 30 is resiliently bendable to a second position (not shown) toward the first surface of the spring clip 12 by manipulation by an operator of a spring member 40 attached to the second end 16 of the spring clip 12.

Referring to FIGS. 1, 2, and 4a, the spring member 40 is formed as an articulated arm assembly extension of the spring clip second end 16. The spring member 40 is composed of a material such as spring steel or another resilient material that is flexible and repetitively returns to an original position after manipulation. The spring member 40 includes a cantilevered end 42 biased in a position proximate an upper surface of the second clip member 28 at about the second bend 34 portion. The cantilevered end 42 is biased against the upper surface of the second clip member 28 by pressure applied against an actuator side 44 and/or an end of the spring member 40 proximate to second end 16. The spring clip 12, clip members 18, 28, and spring member 40 are composed of resilient material such as a lightweight metal. The various components of the spring clip 12 may be formed by selectively bending a portion of material to obtain the configuration illustrated in FIG. 2. The lightweight metal may include spring steel or a similar composite material that is bendable and resiliently returns to an original shape after repetitive manipulations.

Figure 5:
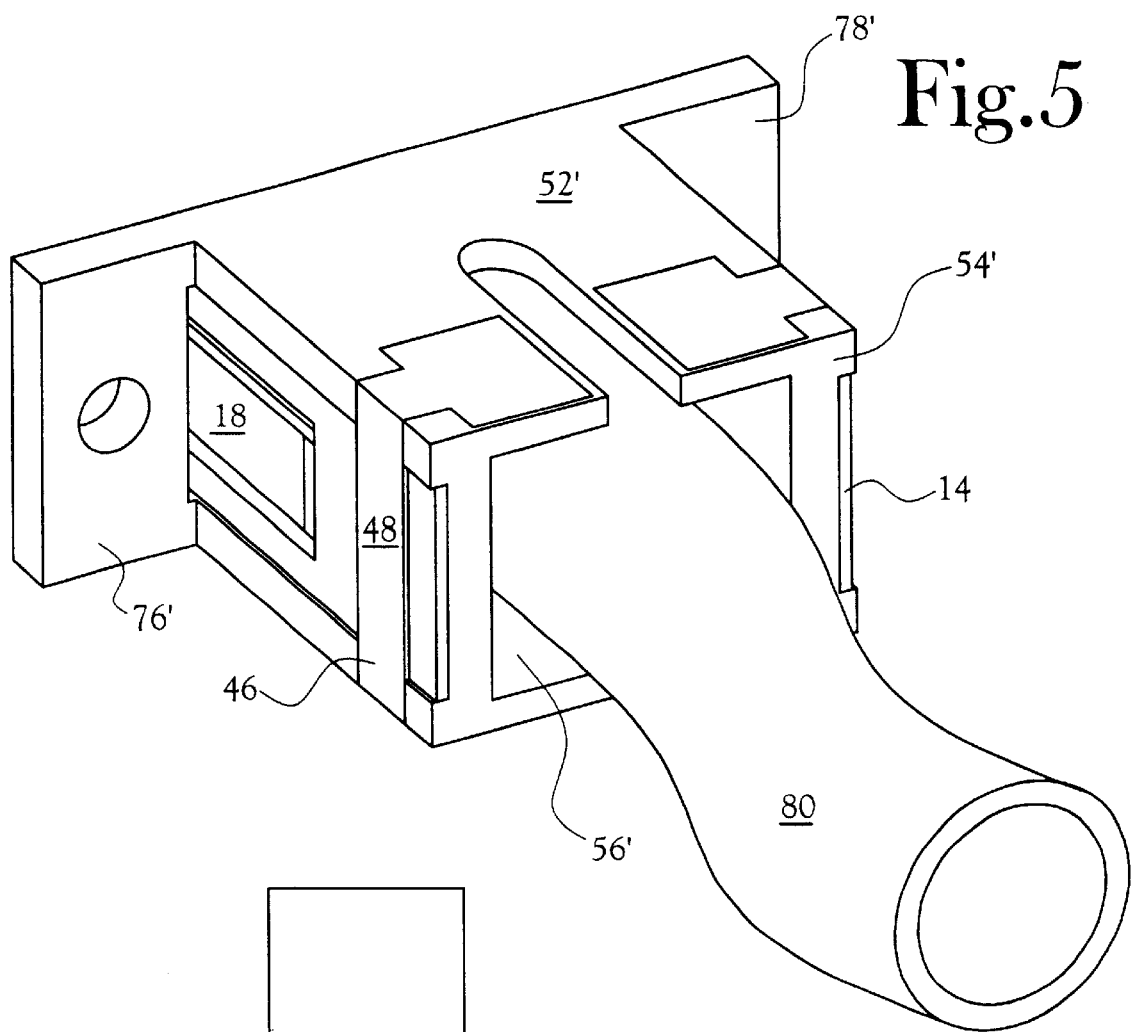
FIG. 5 is a perspective view of a connector housing having a fiber optic cable inserted into one end of the connector housing.

Referring to FIGS. 1 and 4a, at least two spring clips 12 are connectable to a first connector housing 52 having a pair of connector grooves 62, 64 on opposed exterior sides of the housing 52. A first distal end 54 of the housing 52 encloses a central opening 56 for insertion of an optic fiber cable end 80 (see FIG. 5). A first connector groove 62 is extended along a first side of the housing 52 to a second end 58 of the housing. The first connector groove 62 is aligned with the length axis of the housing 52. A second connector groove 64 is extended along a second side of the housing 52 opposed from the first side, to the second end 58 of the housing. The second connector groove 64 is aligned with the length axis of the connector housing 52. Each groove 62, 64 extends respectively through a generally rectangular opening 68 through respective first connector seating flange 76 and second connector seating flange 78 proximate the second end 58 of the housing 52. The second end 58 encloses a second central opening 60 through which an interior conduit 66 (see FIG. 3) may be positioned for extension from the first distal end 54 to the second end 58 of each housing 52, 52'. The first connector seating flange 76 and the second connector seating flange 78 are each extended from the second end 58 in perpendicular configuration from respective first and second opposed sides of the exterior surface of each housing 52, 52'.

In one embodiment illustrated in FIG. 1, first and second like configured housings 52, 52' are releasably mounted together with second end 58 of the first housing positioned against second end 58' of second housing. In an alternative embodiment illustrated in FIG. 4a, first and second like configured connector housings 52, 52' are fused together at the proximal or second ends 58, 58' to form a rigid length of connector housing 52, 52', to which the respective spring clips 12, 12' are attached.

Figure 4B:
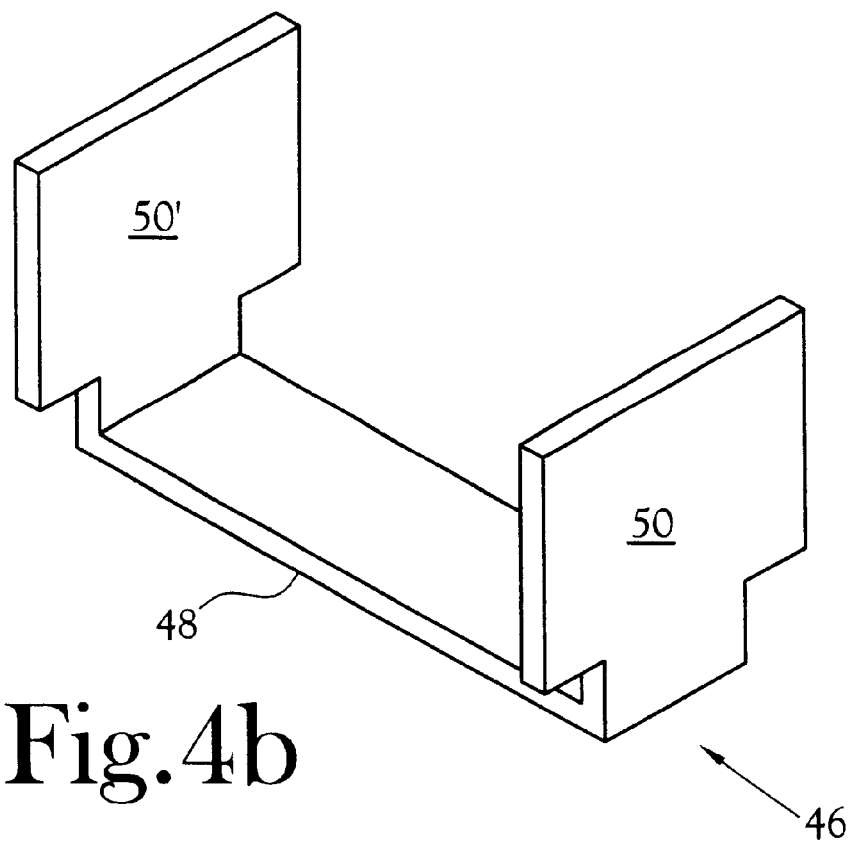
FIG. 4b is a perspective view of a restraining clip for attachment on an end of the connector housing of FIG. 3.

On the distal end 54' of connector housing 52' (see FIGS. 5 and 7), a restraining means is positioned, such as a restraining clip 46 positioned around at least two sides of the distal end 54'. As illustrated in FIG. 4b, the restraining clip 46 includes a U-shaped configuration having a central restraint segment 48 that connects two opposed segments 50, 50' which fit around the first distal end 54 of the connector housing 52. When the central restraint segment 48 is positioned on the second distal end 54', the segment 48 provides pressure against the first clip member 18, when the spring clip 12 is manipulated by the operator to slide along groove 62 toward the second distal end 54', thereby bending first clip member 18 toward the plane of the surface of the mid-portion 26 (see FIGS. 7 and 8a).

To facilitate proper aligning of optic fiber cable ends 80, 82 (see FIG. 7) connected in each opposed distal ends 54, 54', and to provide for quick-disconnect for connector housing 52, 52' from an enclosure 84, a method of releasably connecting the connector assembly 10 is disclosed. The method includes removably inserting a pair of spring clips 12, 12' into respective grooves 62, 64 on each housing (see FIGS. 1, 4a, and 7). The step of inserting each spring clip 12, 12' includes inserting along each respective groove 62, 64 so that insertion end 14 is extended through openings 68, 68' by depressing first clip member 18 and extending through openings 68, 68'. Upon passage through openings 68, 68', each free end 20 of first clip member 18 resumes a height of about one millimeter to about two millimeters above the horizontal plane of the first surface of each spring clip 12, 12', therefore locking each first clip member 18 on an interior side of first connector seating flanges 76, 76' and second connector seating flanges 78, 78' (see FIGS. 4a and 7). Upon insertion of each spring clip 12 along each respective groove 62, 64, the first clip member 18 and second clip member 28 are maintained in an extended configuration above the plane of the first surface of each spring clip 12, 12', therefore limiting movement of each spring clip 12 along each respective groove 62, 64.

Figure 8A:
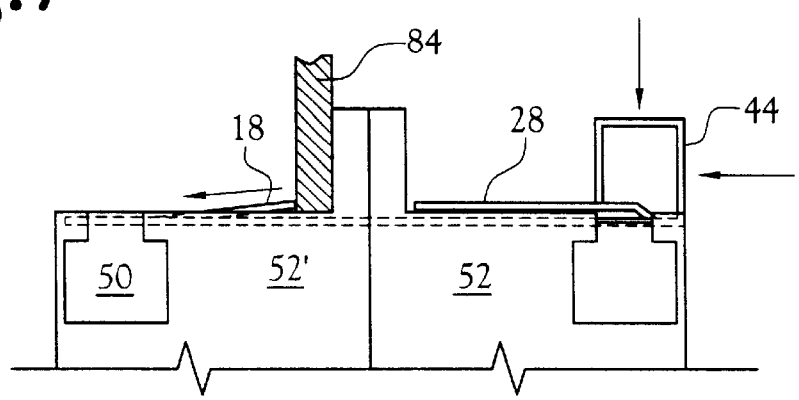
FIG. 8a is a side view of FIG. 7 illustrating a first step of disengaging the connector housing from an enclosure.
Figure 8B:
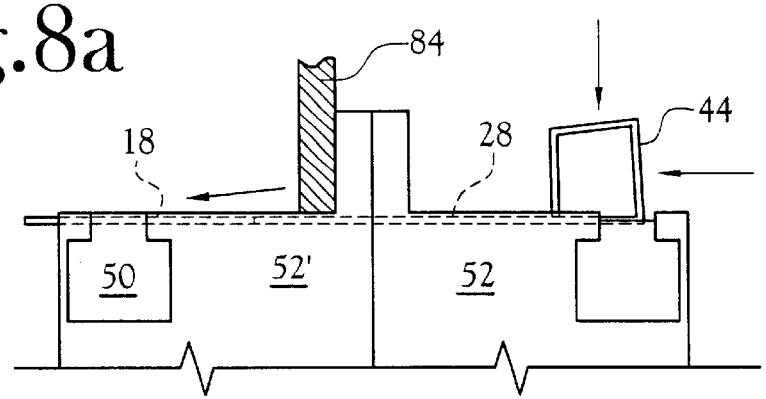
FIG. 8b is a side view of FIG. 7 illustrating a second step of disengaging the connector housing of FIG. 8a from an enclosure.
Figure 8C:
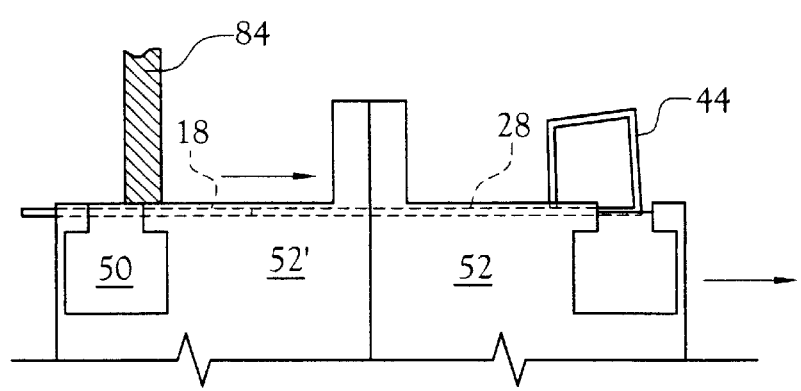
FIG. 8c is a side view of FIG. 7 illustrating a third step of disengaging the connector housing of FIG. 8b from an enclosure.

The step of disconnection for the connector housing 52, 52' from an opening in an enclosure 84 includes manipulation of actuator member 44 of spring member 40 (see FIG. 8a), to compress the second clip member 28, with allows second clip member 28 and spring clip 12 to slide through openings 68, 68' of first and second connector seating flanges 76, 76,' (see FIGS. 8b and 8c). By sliding spring clip 12 toward second housing 52', the insertion end 14 moves along connector groove 62, which forces first clip member 18 against restraint segment 48 of restraining clip 46. When first clip member 18 is forced under restraint segment 48 on second housing 52', the pressure applied by restraint segment 48 compresses first clip member 18 into a bent position toward the first surface of the spring clip 12. With first clip member 18 maintained in a bent position under restraint segment 48, the second housing 52' is slidably removable with the first housing 52 from the opening in enclosure 84 (see FIG. 8c). Detachment of each spring clip 12, 12' from first housing 52 is possible but not required for an operator to remove first housing 52 and second housing 52' from enclosure 84. For detachment of each spring clip 12, 12' from housing 52 for maintenance or replacement of a spring clip 12, the operator maintains compression on each actuator member 44, maintaining each clip member 28 in a bent position for passage of first insertion end 14 through opening 68. When housings 52, 52' are disconnected from enclosure 84, each fiber optic cable 80 and/or 82 are available for maintenance by the operator without requiring access by the operator to the interior portion of enclosure 84. Each one of the pair of spring clips 12, 12' may be reinserted into respective connector groove 62, 64 for releasably mating the housings 52, 52' together and for reinsertion through a similar configured opening of an enclosure 84.

Figure 7:
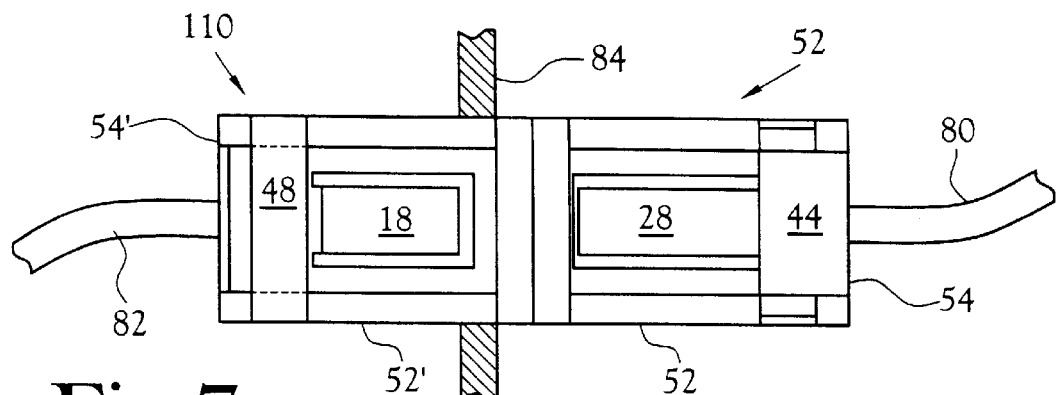
FIG. 7 is a top view of a connector housing mounted to extend through an opening in an enclosure.

The preferred embodiment includes a first fiber optic cable end 80 connectable into the first distal end 54 of a first housing 52, and a second fiber optic cable 82 connectable into the first distal end 54' of a second housing 52', to allow transmission of optically transmitted information along the interior conduit 66 within the first housing 52 and the second housing 52' (see FIG. 7). It will be understood by those skilled in the art that the interior conduit 66 or a similar configured ferrule may be utilized for support of the end of a second fiber optic cable 82 (FIG. 7) for alignment with the end of the first fiber optic cable 80 such that optical fiber communication is established and maintained between the two cables 80, 82.

Figure 4C:
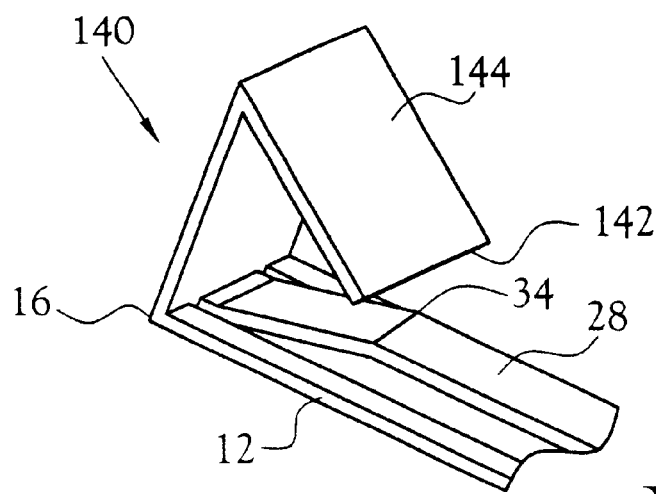
FIG. 4c is a perspective view of an alternative embodiment of a spring clip of FIG. 2.

An alternative embodiment of the spring member 140 is illustrated in FIG. 4c. Spring member 140 is formed as an articulated triangular arm assembly extension of the spring member second end 16 (see FIG. 4c). The spring member 140 may be composed of a material such as spring steel or another resilient material that is flexible and repetitively returns to an original position after manipulation. The spring member 140 includes a cantilevered end 142 biased in a position proximate an upper surface of the second clip member 28 at about the second bend 34 portion. The cantilevered end 142 is biased against the upper surface of the second clip member 28 by applied pressure against an actuator side 144 and/or an end of the spring member 140.

Figure 6:
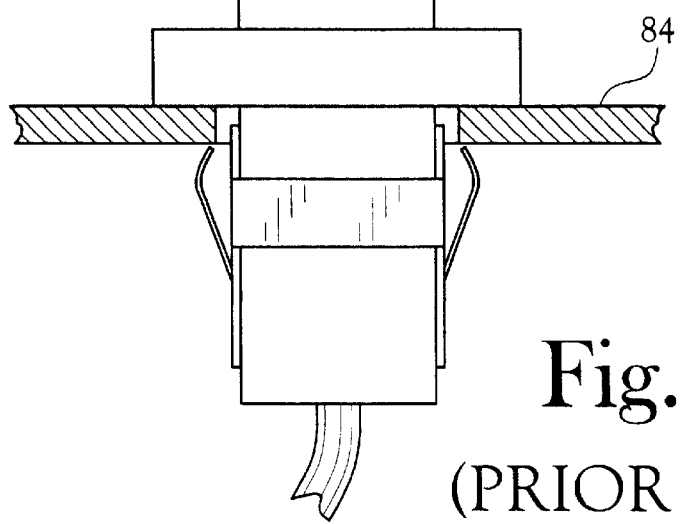
FIG. 6 is a perspective view of a prior art fiber optic connector component mounted through an opening in a panel.

From the foregoing description, it will be recognized by those skilled in the art that a spring clip and connector housing is provided offering advantages over the prior art (see FIG. 6), for releasably mating a pair of connector housing components with an opening through an enclosure to which an operator seeks to connect at least one fiber optic cable thereto. Specifically, the spring clip 12 and connector housing 52 provides an efficient mechanism for connecting one or more housings together, and connecting one housing into an opening in an enclosure without having to access the interior of the enclosure in which the connector housings are mounted. Accordingly, the spring clip and associated connector housing provides for expedient removal of the housing having a fiber optic cable connected thereto, for repair, cleaning, and/or changing of the fiber optic cable ends connected to the housing. Moreover, it will be recognized that the integral construction of the spring clip 12 having at least two clip members 18, 28 and a spring member 40 formed thereon, simplifies manufacturing and reduces manufacturing costs of the spring clip 12.

While numerous embodiments are illustrated and described, it will be recognized that alternative embodiments of the disclosed invention may be employed without departing from the spirit and the scope of the invention as set forth in the appended claims. Further, the disclosed invention is intended to cover all modifications and alternate methods falling within the spirit and the scope of the invention as set forth in the appended claims.

What is claimed is:

1. An apparatus for releasably mating a pair of fiber optic cables positioned on opposed sides of an enclosure, said apparatus comprising:

a spring clip having a first clip member;

a connector housing having a first distal end and a second distal end disposed in an aligned configuration, said second distal end removably insertable through an opening in the enclosure, said spring clip in slidable communication with said connector housing; and a restraining clip attached to said second distal end of said connector housing for selectively compressing said first clip member of said spring clip when said spring clip is manipulated by an operator;

whereby said first clip member is selectively compressed by said restraining clip when said spring clip is manipulated and moved toward said second distal end by the operator for removal from the opening of the enclosure.

2. The apparatus of claim 1, wherein said connector housing includes a seating flange located proximal to a mid-portion of said connector housing, said seating flange sized to be positioned against an outer surface of the enclosure when said second distal end of said connector housing is removably inserted through the opening of the enclosure.

3. The apparatus of claim 2, wherein said spring clip includes a first surface extended between a first insertion end and a second end of said spring clip, said first clip member positioned proximate said first insertion end, said first clip member having a cantilevered end extended outwards from said first surface.

4. The apparatus of claim 3, wherein said spring clip further includes at least two clip members disposed in opposing relationship, each of said at least two clip members having a cantilevered end extended outwards from said first surface.

5. The apparatus of claim 2, wherein said connector housing further including:

said first distal end having a first opening therein;

said second distal end having a second opening therein, said second distal end having a restraining clip connectable on at least three sides of said second distal end, said seating flange extended generally perpendicular from a first side and an opposed second side of a mid-portion of said connector housing, said seating flange having a respective first and second opening therethrough and proximate said first and second sides of said connector housing;

a first connector groove extended along said first side of said connector housing from said first distal end to said second distal end, said first connector groove extends through said first opening in said seating flange on said first side, said first connector groove opens outwardly from said first side of said connector housing, and opens outwardly from said first distal end and said second distal end of said connector housing, said first connector groove sized for removable attachment of said spring clip therein;

a second connector groove extended along said second side opposed from said first side of said connector housing, said second connector groove extends through said second opening in said seating flange on said second side, said second connector groove opens outwardly from said second side of said connector housing and opens outwardly from said first distal end and said second distal end, said second connector groove sized for removable attachment therein of an second spring clip of like configuration as said spring clip; and a conduit positioned within and along a length axis of said connector housing, said conduit extended interior of said connector housing between said first distal end and said second distal end;

whereby a first optic fiber cable is insertable in said first distal end of said connector housing, and a second optic fiber cable is insertable in said second distal end, said the first optic fiber cable is in optical communication with the second optic fiber cable through said interior conduit of said connector housing.

6. A connector assembly for releasably mating the connector housing to an opening in an enclosure, the connector assembly having at least one fiber optic cable connectable thereto, comprising:

a spring clip having a generally planar first surface extended between a first insertion end and a second end of said spring clip, said spring clip having a first clip member and a second clip member disposed on said first surface between said first insertion end and said second end, each of said first and second clip member being disposed upwardly from the horizontal plane of said first surface;

a connector housing having a first distal end and a second distal end disposed in an aligned configuration, said second distal end removably insertable through the opening in the enclosure, said spring clip in slidable communication with said first and second distal end of said connector housing, and an actuator member attached at said second end of said spring clip, said actuator member being disposed out of the horizontal plane of said first surface, said actuator member having a cantilevered end biased against said second clip member;

whereby when said actuator member is pressed against a first end of said second clip member, said free end of said second clip member is biased toward said first surface, thereby said spring clip is slidably movable in relation to said connector housing.

7. The connector assembly of claim 6, wherein said first and second clip members being disposed in opposing relationship on said first surface, said first clip member having said first end connected to said first surface proximal to said first insertion end, and having a free end extended toward said second end of said spring clip and projected out of the horizontal plane of said first surface, said second clip member having said first end connected to said first surface proximal to said second end of said spring clip, and having said free end extended toward said first insertion end of said spring clip and projected out of the horizontal plane of said first surface, said free end of said first clip member oriented toward said free end of said second clip member.

8. The connector assembly of claim 7, wherein said second clip member having an elongated length extended from said first end of said second clip member to said free end of said second clip member, said elongated length being generally parallel to said first surface of said spring clip.

9. The connector assembly of claim 8, wherein said first clip member having an elongated length extended from said first end of said first clip member to said free end of said first clip member, said elongated length being projected at an angle from said first surface of said spring clip.

10. The connector assembly of claim 9, wherein said actuator member including an articulated arm extended from said second end of said spring clip, said articulated arm having said cantilevered end biased in a position proximate said substantially planar length of said second clip member, whereby when said cantilevered end of said articulated arm is pressed against said second clip member, said free end of said second clip member is biased toward the horizontal plane of said first surface of said spring clip.

11. The connector assembly of claim 6, wherein said connector housing including:
   an exterior surface having at least one side being generally planar;
   said first distal end having a first opening therein;
   said second distal end having a second opening therein, said second end having a flange member extended in perpendicular configuration from a first side and from a second side, said flange member having a first opening therethrough and proximal to said first side, and having a second opening therethrough and proximal to said second side of said exterior surface; and
   a connector groove extended along at least one side of said exterior surface, said connector groove extends through said first opening in said flange member, said connector groove opens outwardly from said at least one side of said connector housing, and opens outwardly from said first distal end and said second distal end of said connector housing, said connector groove sized for removable attachment of said spring clip therein.

12. The connector assembly of claim 11, wherein said spring clip is insertable into said connector groove, said first insertion end of said spring clip extended along said connector groove from said first end to said second end of said connector housing, said first insertion end extended through said first opening in said flange member, said free end of said first clip member is projected out of the horizontal plane of said first surface of said spring clip after being extended through said first opening in said flange member with said second distal end of said connector housing being positioned interior of the opening of the enclosure.

13. The connector assembly of claim 12, wherein said spring clip is removable from said connector groove by said actuator member being manipulated to depress said second clip member of said spring clip with said spring clip being moved toward said second distal end of said connector housing, said first clip member of said spring clip being depressed by contact against a means for restraining disposed on said second distal end, thereby said first insertion end of said spring clip is moved through said first opening through said flange member of said connector member second end.

14. The connector assembly of claim 13, wherein said means for restraining includes a connector clip positioned around at least two side surfaces of said second distal end, said connector clip defines an elongated body integrally formed from a resilient material.

15. A connector system for removable attachment of a connector housing in an opening of an enclosure, the connector housing aligns a fiber optic cable for optical communication with a second fiber optic cable on opposed ends of the enclosure, comprising:
   a connector housing having a first distal end and a second distal end disposed in an aligned configuration, said second distal end removably insertable through the opening in the enclosure, said aligned first distal end and said second distal end provides optical communication between a first fiber optic cable connectable to said first distal end and a second fiber optic cable connectable to said second distal end; and
   a spring clip having a first insertion end and a second end, said first insertion end having a first clip member positioned thereon, said second end having a second clip member positioned thereon, said first and second clip members extended in a cantilevered position from a first side of said spring clip, said spring clip slidably positioned on said connector housing, said spring clip is removably detachable on said connector housing.

16. The connector system of claim 15, wherein said spring clip including:
   said first clip member and said second clip member disposed in opposing relationship on said first side of said spring clip, said first clip member having a first end connected to said first side proximal to said first insertion end and having a free end extended toward said second end of said spring clip and projected out of the horizontal plane of said first side of said spring clip, said second clip member having a first end connected proximal to said second end of said spring clip, and having a free end extended toward said first insertion end of said spring clip and projected out of the horizontal plane of one side of said first side, said free end of said first clip member oriented toward said free end of said second clip member; and
   a actuator member attached at said second end of said spring clip, said actuator member being disposed out of the horizontal plane of said first side of said spring clip, said actuator member having a cantilevered end biased against said second clip member;
   whereby when said actuator member is pressed against said second clip member, said free end of said second clip member is biased toward the horizontal plane of said first side of said spring clip, said spring clip is removable in attachment with said connector housing.

17. The connector system of claim 16, wherein said connector housing including a first connector groove extended along a first exterior side of said connector housing, said first connector groove extends between said first and second distal ends of said connector housing, said first connector groove opens outwardly from said first exterior side of said connector housing, said first connector groove is sized for slidable insertion of said spring clip therein;
   a second connector groove extended along a second exterior side of said connector housing, said second connector groove extends between said first and second distal ends of said connector housing, said second connector groove opens outwardly from said second exterior side of said connector housing, said second connector groove is sized for slidable insertion of said spring clip therein; and
   a pair of restraining clips positioned around said second distal end, including a first restraining clip being positioned to span said first connector groove extended to said second distal end and a second restraining clip being positioned to span said second connector groove extended to said second distal end;

whereby said spring clip is slidably inserted into said first connector groove or into said second connector groove of said connector housing, with said first insertion end of said spring clip extended under one of said pair of restraining clips positioned around said second distal end.

18. The connector system of claim 17, wherein each of said first restraining clip and said second restraining clip including a U-shaped configuration of said first and second restraining clips, whereby each one of said restraining clips is positioned around said second distal end to span respectively said first connector groove and said second connector groove of said connector housing.

19. The connector system of claim 18, wherein said first clip member is selectively movable to a biased position toward the horizontal plane of said first side of said spring clip when said spring clip is extended along said first connector groove of said connector housing toward said second distal end of said connector housing, and said first clip member is compressed by one of said first restraining clip or said second restraining clip around said second distal end of said connector housing.

20. A method of utilizing a connector system for removable connection in an opening through an enclosure, the connector system having a first and a second fiber optic cable attachable in opposed alignment on respective first and second sides of the opening through the enclosure with the connector system, comprising the steps of:

providing a spring clip, having a first clip member and a second clip member articulated above a first surface of said spring clip;

positioning a connector housing having a first and a second distal end, said second distal end positioned into the opening in the enclosure;

inserting said spring clip in removable engagement against one side of said connector housing, said step of inserting includes inserting said first clip member into the opening in the enclosure on the first side of the opening having the first fiber optic cable thereon and locking said first clip member on the first side of the opening through the enclosure opposite the second side having the second fiber optic cable thereon, said second clip member of said spring clip remaining on the second side of the opening through the enclosure; and providing alignment of the first and second fiber optic cables for optical communication therebetween and within said connector housing.

21. The method of claim 20, further comprising the steps of:

manipulating said second clip member of said spring clip to bias said second clip member toward said first surface of said spring clip;

sliding said spring clip along one side of said connector housing;

bending one end of said first spring clip member of said spring clip against a restraining means positioned around said second distal end, thereby biasing said first clip member of said spring clip toward said first surface of said spring clip; and detaching said connector housing from alignment with the opening through the enclosure.

\* \* \* \* \*